No. 812,418. PATENTED FEB. 13, 1906.
C. GLUYAS.
APPARATUS FOR TREATING SLIMES, &c., FOR THE RECOVERY
OF THE PRECIOUS METALS.
APPLICATION FILED MAY 3, 1905.
3 SHEETS—SHEET 1.
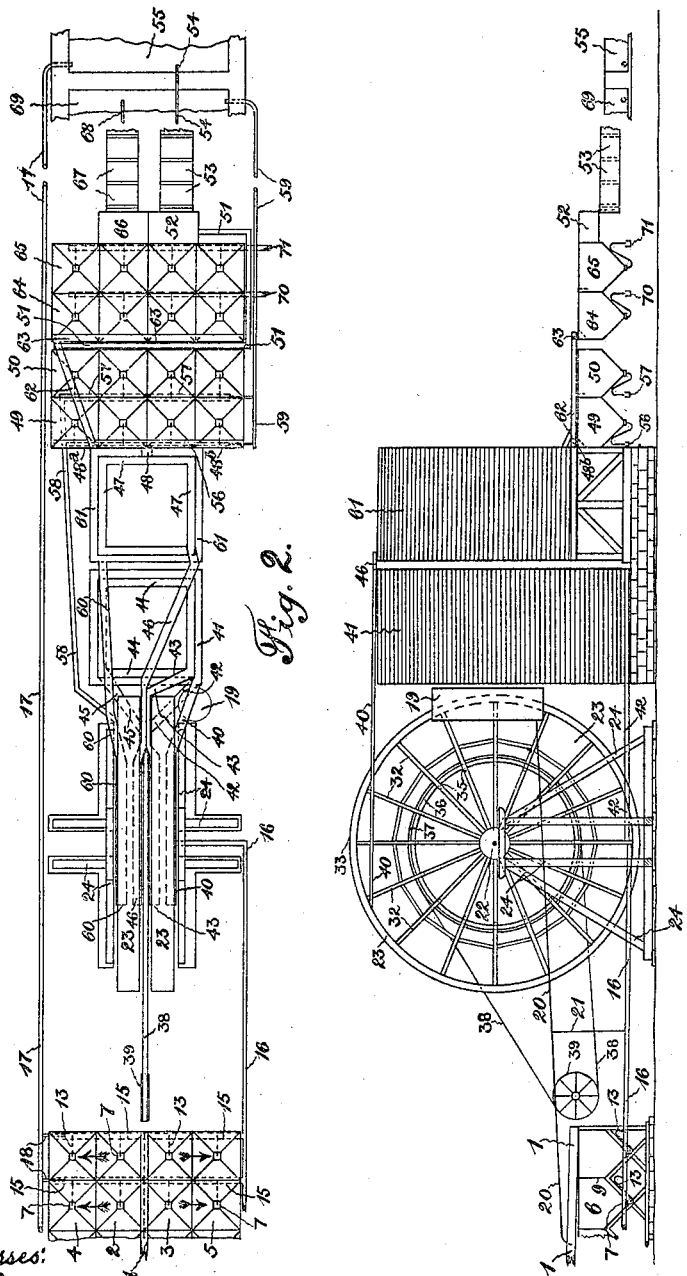

No. 812,418.

PATENTED FEB. 13, 1906.

C. GLUYAS.

APPARATUS FOR TREATING SLIMES, &c., FOR THE RECOVERY OF THE PRECIOUS METALS.

APPLICATION FILED MAY 3, 1905.

3 SHEETS—SHEET 2.

Witnesses:
R. Ovendale
F. Ovendale

Inventor:
Charles Gluyas
by Chas. Ovendale
Attorney

No. 812,418. PATENTED FEB. 13, 1906.
C. GLUYAS.
APPARATUS FOR TREATING SLIMES, &c., FOR THE RECOVERY
OF THE PRECIOUS METALS.
APPLICATION FILED MAY 3, 1905.

3 SHEETS—SHEET 3.

Witnesses:
R. Ovendale
F. Ovendale

Inventor:
Charles Gluyas
by Chas Ovendale
Attorney

UNITED STATES PATENT OFFICE.

CHARLES GLUYAS, OF JOHANNESBURG, TRANSVAAL.

APPARATUS FOR TREATING SLIMES, &c., FOR THE RECOVERY OF THE PRECIOUS METALS.

No. 812,418.

Specification of Letters Patent.

Patented Feb. 13, 1906.

Application filed May 3, 1905. Serial No. 258,676.

*To all whom it may concern:*

Be it known that I, CHARLES GLUYAS, a subject of the King of Great Britain, residing at Johannesburg, Transvaal, have invented certain new and useful Improvements in Apparatus for Treating Slimes Produced in the Reduction of Auriferous Ores for the Recovery of the Precious Metal, of which the following is a specification.

The present invention has reference to an apparatus or plant designed for the treatment of the slimes (the finer particles of pulverized ore) produced in the reduction of auriferous ore for the purpose of recovering or extracting the precious metal therefrom.

The object of the present invention is to provide a plant in which the process of treating the slimes may be carried on continuously and in an efficient manner at comparatively small cost, thereby enabling low-grade slimes to be treated profitably.

My improved plant calls for very little attention. It can be run by unskilled labor, and a very high extraction of the precious metal is obtained. In it the slimes remain in contact with the cyanid or other solvent solution for a prolonged period, and the mixture of slimes and solution being always exposed to the atmosphere is thereby thoroughly aerated, and, further, said mixture is subjected to a continuous agitation during the whole period that the material is under treatment. Another important advantage of the improved plant lies in the comparatively small initial cost of construction.

In order that the construction and arrangement of my improved plant may be more readily understood, I append explanatory drawings thereof, which are marked with numerals of reference corresponding to the following description.

Figure 4:
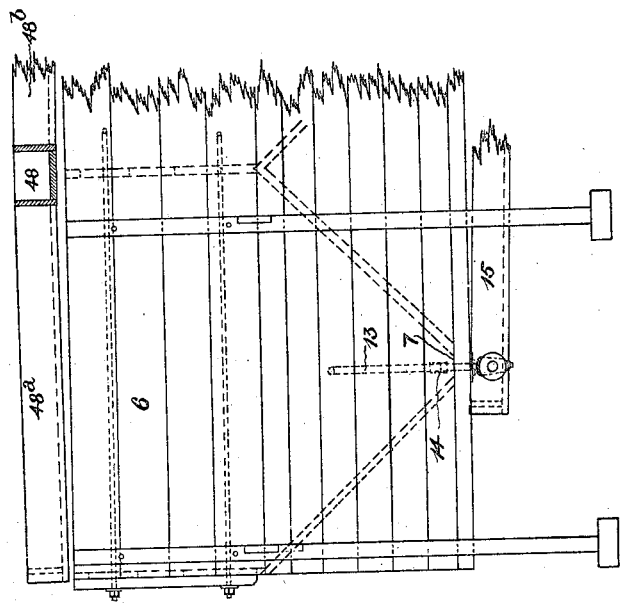
Figure 3:
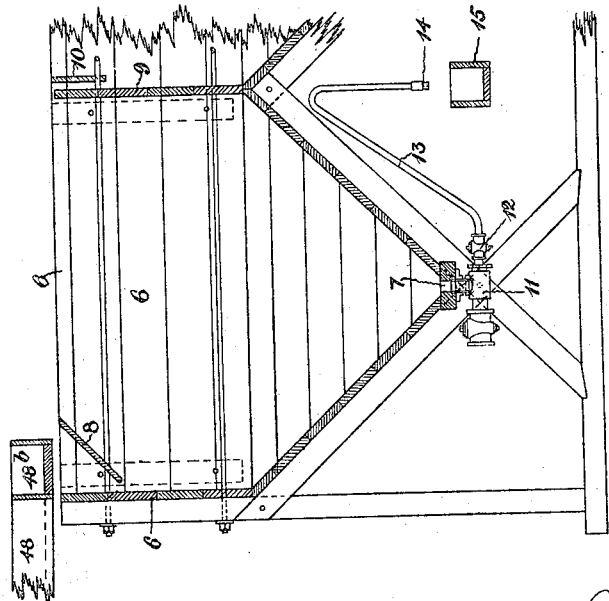
Figure 5:
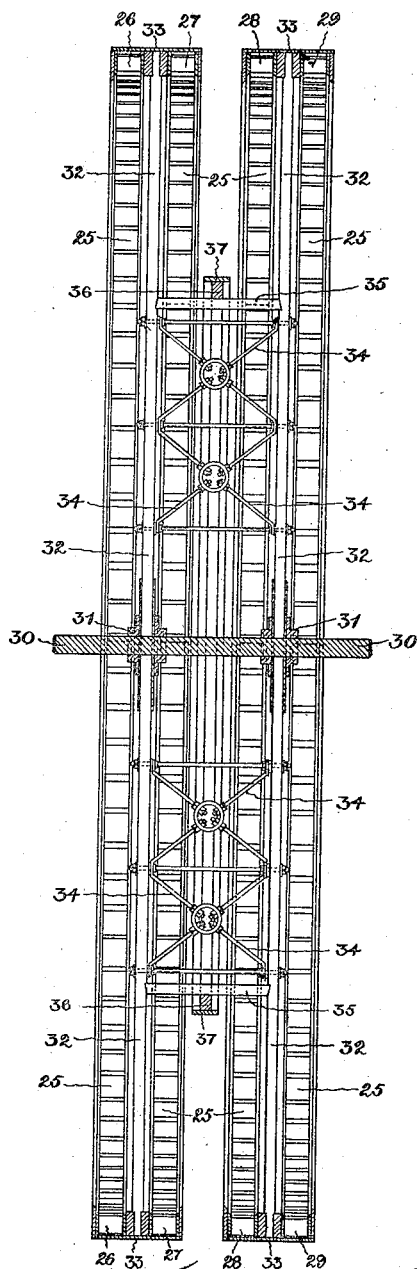

Figure 1 represents in side elevation the general arrangement of the plant, and Fig. 2 represents it in plan. Fig. 3 is a sectional elevation of one of the settling-boxes. Fig. 4 is an end elevation of Fig. 3. Fig. 5 is a sectional elevation of the wheels employed for elevating the mixture during the process of treatment.

In the general arrangement of the plant, as illustrated in Figs. 1 and 2, 1 represents a launder or trough, along which the slimes (the residue after the sands or coarser particles of the pulverized ore have been removed) flow to a series of settling-boxes. A sufficient number of the settling-boxes is provided, (varying with the quantity of slimes or material to be dealt with or treated,) so that the final overflow from said boxes is practically clear liquid, which may be passed along launders or pipes to a sump, from which it may be pumped or drawn to the mill service-reservoir for ordinary milling purposes or otherwise, as may be desired. In the arrangement shown in Figs. 1 and 2 four parallel rows of the settling-boxes are provided. The launder 1 is arranged between the two center rows of boxes, and the slimes flow through holes or apertures formed in the vertical sides of the launder 1 into the two center or intermediate rows 2 3 of said settling-boxes or at each side of said launder 1. In these two parallel rows 2 3 of the boxes into which the slimes first pass from the launder 1 the bulk of the solid matter contained in the slimes is collected. The overflow from the two rows 2 3 of boxes then flows in the direction indicated by the arrows into the two outside and parallel rows of boxes 4 5. In these two rows 4 5 of boxes practically the whole of the solid matter remaining in the liquid after it leaves the boxes 2 3 is collected, so that the final overflow from the boxes 4 5 is practically clear liquid. As previously explained, this final overflow may be conducted to a sump for further use. The settling-boxes may be of the usual construction, as illustrated in Figs. 3 and 4—that is to say, they may be constructed with vertical sides 6 for a portion of their height and then be inclined to a bottom discharge-outlet 7. The settling-boxes are also preferably fitted with baffle plates or boards 8, which serve for conducting the inflowing stream down into the box or preventing said stream flowing direct to the overflow. The division or partition 9 between the rows of boxes is somewhat less in height than the other sides 6 of the box, and the baffle plate or board 10 is arranged in connection with the partition 9 to cause the overflow to pass under it or prevent it passing direct to the overflow. In Fig. 3 the discharge-outlet 7 at the bottom of the box is constructed in the main sill or plank upon which the box is built. In the outlets 7 are fitted T-pieces 11, one branch communicating with the interior of the settling-box, another branch being fitted with a blow-off cock, and the other branch being fitted with a valve 12 for regulating the discharge. To this valve 12 is attached the upwardly-inclined discharge-pipe 13, which is carried up to a suitable height and then turned downward and at its extremity fitted with a reduced nozzle 14 or otherwise constructed with a restricted orifice of such a size that the matter or concentrated slimes passing or discharged through it are of a suitable density or consistency. The slimes or solid matter is separated from the water or other liquid in the settling-boxes, and the discharge-pipes 13 being carried up for about half the height of the boxes (more or less) have the effect of concentrating the slimes to some extent, so that they are discharged with a much smaller quantity of water than would otherwise be possible. The pipes 13 are arranged to discharge the concentrated slimes into launders 15, which latter at their lower ends communicate with another launder 16, hereinafter referred to.

17 is a pipe which serves for conducting the cyanid or other solvent solution to mix with the concentrated slimes as they flow down the launders 15 into the launder 16, and 18 represents branch pipes from the solution-pipe 17, discharging the solution into the launders 15 at their upper ends. The source of supply of the solvent solution to the pipes 17 is hereinafter stated. The cyanid or other solvent solution is of a suitable strength and a steady and continuous supply is maintained in the launders 15. The quantity of the solvent solution flowing into the launders 15 is approximately equal to that of the concentrated slimes or in the proportion of one of solution to one of slimes, and as they flow down said launders they are thereby thoroughly mixed.

A tank 19 of any suitable construction is provided for holding lime-water, and a pipe 20, leading from said tank 19, serves for conducting a quantity of said lime-water to the slimes in the launder 1 before it enters the settling-boxes, and 21 is a branch pipe from the pipe 20 for conducting a suitable small quantity of the lime-water to the mixture of concentrated slimes and solvent solution in the launder 16 in order to render it slightly alkaline.

Arranged in a convenient position in relation to the settling-boxes is an arrangement of four elevating-wheels or two twin or compound wheels. (Shown in detail in Fig. 5.) The bearings 22 for the wheels 23, as shown in Fig. 1, are carried by means of trestles 24 or other suitable structure. The wheels 23 are of such construction that they provide four separate and distinct compartments, the buckets 25 of each compartment serving to receive and elevate four separate and distinct streams. As shown in Fig. 5, the wheels 23 are two twin or compound wheels, of which 26 represents the first compartment, and 27 the second compartment, of the first wheel, and 28 and 29 the first and second compartments, respectively, of the second wheel. 30 represents the shaft upon which the wheels are mounted, 31 the centers or hubs of the wheels, 32 the arms or spokes of the wheels, and 33 the caps, rings, or cylinders which form the peripheries of the wheels. The two wheels 23 are rigidly connected by means of the braces 34, which pass through the arms 32. Between the wheels 23 and mortised or otherwise fixed to the arms 32 are a number of bearers or carriers 35 for a ring 36, round which is secured a ring or cylinder 37, which forms the face of the wheel, through the medium of which the elevating-wheels 23 are driven.

The elevating-wheels 23 are driven by means of a belt 38 from a driving-pulley 39, to which motion is imparted in any suitable manner.

The launder 16 discharges the mixture of slimes and solvent solution into the buckets 25 of the compartment 26 of the first wheel 23. In this compartment 26 the mixture is elevated and delivered into a launder 40, along which it is conducted to the top of what I may designate the "first" circulating-tower 41. This tower 41 consists of a number of superimposed and suitably-inclined launders, along which the mixture flows in a more or less spiral course from the top to the bottom of said tower 41. Spaces are left between the tiers of launders to allow air to circulate freely through the towers. The mixture leaves this tower 41 by the launder 42, by means of which it is conducted into the buckets 25 in the second compartment 27 of the first wheel 23. In this compartment 27 the mixture is elevated to another launder 43, along which it flows to a second circulating-tower 44, similar in construction to the first circulating-tower 41, but arranged inside the latter. The mixture then leaves the second circulating-tower 44 by the launder 45, by means of which it is conducted and delivered into the first compartment 28 of the second wheel, which in like manner elevates it to a launder 46, conducting it to a third tower 47 of like construction. The mixture passes out of the third circulating-tower 47 along the launder 48 to a series of settling-boxes 49, in which the solvent solution is separated from the solid matter. In Figs. 3 and 4 the settling-boxes provided at this point are represented. In these figures, 48 is the launder from the third circulating-tower 47, shown communicating with two inclined launders 48 48$^b$ at the head of the first series of settling-boxes. From these latter launders the mixture flows in front of the baffle-plates 8. 50 represents the second series of settling-boxes for separating the solvent solution from the solid matter or slimes. The overflow from this second series of settling-boxes 50 passes into a launder 51, along which it flows to a filter-box 52 and from the latter through extractor-boxes 53, by means of which the gold is extracted from the solvent solution. 54 is a pipe which serves for conducting the solvent solution after it has passed through the extractor-boxes 53 to the first or strong solution sump 55. In the filters any slime or solid matter which may be carried in suspension in the liquid is removed, which prevents the slime or solid matter being carried into the extractor-boxes, and the fouling of the zinc shavings is thereby prevented. The slimes separated from the first or strong solution by means of the settling-boxes 49 50 are delivered into launders 56 57, which communicate with a launder 58. 59 is a pipe which serves for conducting a second and weaker cyanid or other solvent solution to the head of the launders 56 57 to mix with the slimes from the settling-boxes 49 50. The second or weaker solution is thoroughly mixed with the slimes as they flow down the launders 56, 57, and 58, along which latter they are conducted to the second compartment 29 of the second wheel 23. In this compartment 29 of the second wheel the slimes and weaker solution are raised to a launder 60, along which the mixture flows to a fourth circulating-tower 61 of the same construction as those previously described. The mixture leaves the fourth circulating-tower 61 at the bottom by the launder 62, along which it flows to a launder 63, which serves for distributing it into the first series 64 of the weaker-solution separating-boxes. 65 represents the second series of the weaker-solution settling-boxes into which the overflow from the first series 64 passes. The overflow of the weaker solvent solution from the second series 65 is conducted into a separate filter-box 66, from which it passes through separate extractor-boxes 67, finally leaving the latter by a pipe 68 for the weak-solution sump or tank 69. The pipe 59, serving for supplying the weaker cyanid solution, is shown communicating with the weak-solution sump 69, which constitutes the source of supply of the weaker solution. The supply of the first or stronger cyanid solution flowing along the pipe 17 to the launders 15 and 16 is shown communicating with the strong-solution sump 55, which constitutes the source of supply. In order to maintain the solution in the sump 55 at the requisite strength, a quantity of cyanid solution is added to the solution as it leaves the extractor-boxes 53 on its way to the sump 55 or otherwise, as preferred.

70 71 are launders which serve for receiving the slimes from the weak-solution settling-boxes 64 65 and for conducting the same to the waste-dam or otherwise, as preferred.

It will be obvious that instead of using a weak solvent solution for mixing with the slimes after the stronger solution has been extracted I may use a water wash, or by suitable additions to the plant I may use a first or strong solution and then either one or more weak solutions or one or more weak solutions and a final water wash. It will also be evident that by means of the circulating-towers and wheels I obtain a prolonged contact of the cyanid or other solvent solution with the slimes, that I obtain a thorough aeration of the mixture, and that a continuous agitation of the mixture is obtained in the wheels and circulating-towers, the wheels serving for elevating the mixture as well as for agitating it.

While I prefer the arrangement of the wheels for elevating the mixture to the circulating-towers, other means may be employed in substitution therefor, such as a suitable arrangement of pumps.

What I claim as my invention, and desire to protect by Letters Patent, is—

1. In apparatus for treating metal-bearing material, a plurality of elevating-wheels and aerating devices interposed in the circuit of the material between said elevating devices; substantially as described.

2. In apparatus for treating metal-bearing material, a plurality of elevating devices, and aerating devices comprising a plurality of superposed launders interposed in the circuit of the material between said elevating devices; substantially as described.

3. In apparatus for treating metal-bearing material, a plurality of elevating devices, and aerating devices comprising a plurality of superposed helically-disposed launders interposed in the circuit of the material between said elevating devices; substantially as described.

4. In apparatus for treating metal-bearing material, a plurality of elevating-wheels arranged side by side, and aerating devices interposed in the circuit of the material between said elevating-wheels; substantially as described.

5. In apparatus for treating metal-bearing material, an elevating device comprising a wheel having a plurality of sets of elevating-buckets, means for driving said wheel, and means for conveying the material to said sets of buckets in succession; substantially as described.

6. In apparatus for treating metal-bearing material, an elevating device comprising a plurality of wheels, each provided with a plurality of sets of elevating-buckets, means for driving said wheels, and means for conveying the material in succession to said several sets of buckets; substantially as described.

7. In apparatus for treating metal-bearing material, an elevating device comprising a plurality of wheels, each provided with a plurality of sets of elevating-buckets, means for driving said wheels, means for conveying the material in succession to said several sets of buckets, and aerating devices interposed in said conveying means; substantially as described.

8. In apparatus for treating metal-bearing material, an elevating device comprising a plurality of wheels, each provided with a plurality of sets of elevating-buckets, means for driving said wheels, means for conveying the material in succession to said several sets of buckets, and aerating devices comprising superposed launders interposed in said conveying means; substantially as described.

In witness whereof I have hereunto set my hand in the presence of two subscribing witnesses.

CHARLES GLUYAS.

Witnesses:
    CHAS. OVENDALE,
    R. OVENDALE.